May 5, 1959 M. BETHEA 2,885,167
BUNDLING YOKE FOR CONNECTING SUSPENSION CLAMPS
Filed Feb. 13, 1956

INVENTOR.
MALCOLM BETHEA
BY Jennings & Carter
ATTORNEYS

United States Patent Office 2,885,167
Patented May 5, 1959

2,885,167

BUNDLING YOKE FOR CONNECTING SUSPENSION CLAMPS

Malcolm Bethea, Birmingham, Ala., assignor to Bethea Company Incorporated, a corporation of Alabama Application February 13, 1956, Serial No. 565,088

2 Claims. (Cl. 248—63)

This invention relates to a bundling yoke for connecting suspension clamps and has for an object the provision of such a yoke which shall permit the suspension clamps to move relative to each other about a single pivotal axis.

Another object of my invention is to provide a bundling yoke for suspension clamps which shall be adapted for installation on the first suspension clamp erected and then later connected to a second suspension clamp without having to interfere with the clevis pin which supports the suspension clamp originally erected.

Another object of my invention is to provide a bundling yoke of the character designated which is supported from the lower surface of a superjacent suspension clamp, thereby providing a strudy connection which does not weaken the hinge pin of the supporting suspension clamp.

A further object of my invention is to provide a bundling yoke for suspension clamps which is adapted for installation on conventional type suspension clamps without the necessity of providing additional bolts for securing the yoke to the clamp.

A further object of my invention is to provide a bundling yoke of the character designated which shall be adapted for supporting a bundling strap without the necessity of attaching the strap to the clevis pin of the supporting clamp.

A still further object of my invention is to provide a bundling yoke of the character designated which shall be simple of construction, economical of manufacture and one which readily lends itself to mass production.

Heretofore in the art to which my invention relates, difficulties have been encountered in the connection of suspension clamps to each other due to the fact that the connecting member, such as a bundling strap, has been connected directly to the hinge pin of the suspension clamp initially installed. Accordingly, the connecting member must be connected to the hinge pin of the first installed suspension clamp at the time of installation or the hinge pin must be removed later from its supporting member and the connecting member attached thereto. If the connecting members are attached at the time the first suspension clamp is installed, the loose members hanging down from the clamp makes so much noise that power companies have been required to remove the same. On the other hand, if the hinge pin is removed from the first installed suspension clamp for attaching the connecting member, the power line is disconnected from its supporting member and must be reconnected after the connecting member has been attached to the hinge pin. Also, where the connecting member is attached to the hinge pin, the hinge pin is weakened and must be of a greater length for receiving the connecting members. To overcome these difficulties I provide a connecting member which has no connection to the hinge pin of the suspension clamp initially installed.

A bundling yoke embodying features of my invention is illustrated in the accompanying drawing, forming a part of this application, in which.

Figure 2:
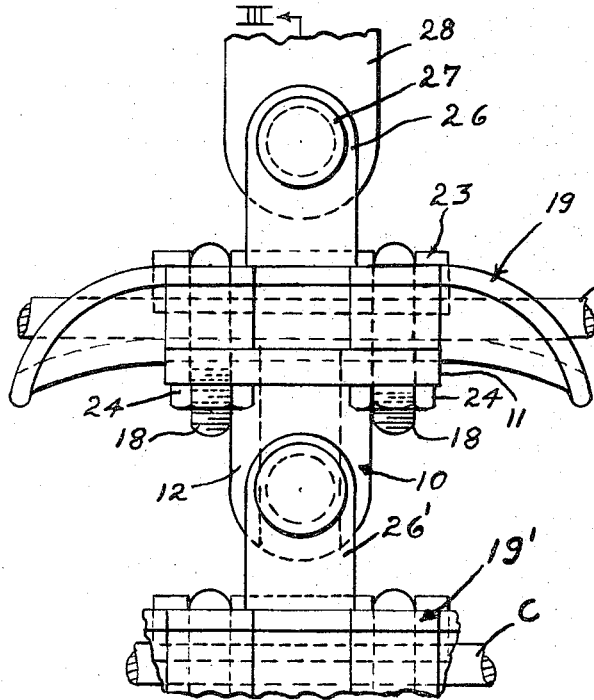
Fig. 2 is a side elevational view, partly broken away and in section, showing the yoke connecting upper and lower suspension clamps.
Figure 3:
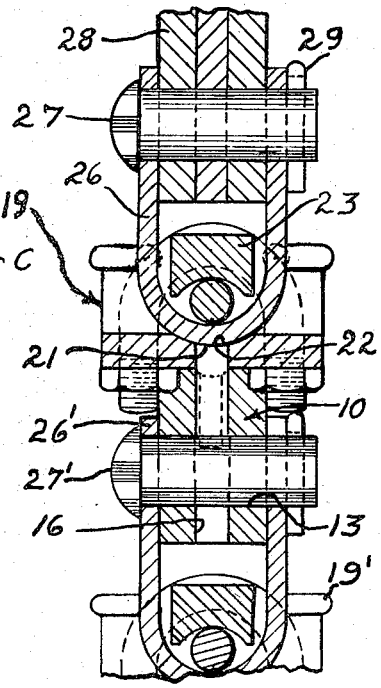
Fig. 3 is a sectional view taken generally along the line III—III of Fig. 2; and, Fig. 4 is a fragmental view showing a modified form of connecting member.
Figures 1, 4:
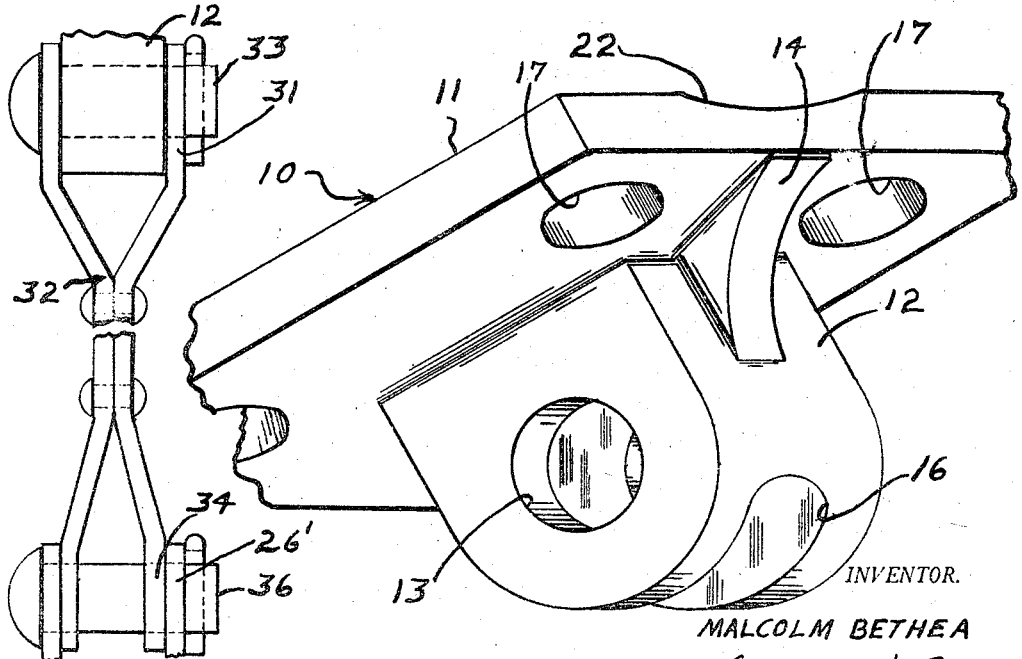
Fig. 1 is an isometric view, partly broken away.

Referring now to the drawing for a better understanding of my invention, I show my improved bundling yoke generally at 10. The bundling yoke 10 is in the form of a bracket having a relatively flat body portion 11 which is formed integrally with an outwardly projecting protuberance 12 having a transverse opening 13 therethrough. To add strength to the yoke 10, reinforcing members 14 may be provided at the juncture of the body portion 11 and the protuberance 12, as shown in Fig. 1. A vertical opening 16 is provided in the yoke 10, as shown in Figs. 1 and 3, thereby providing free drainage for the yoke and making the yoke lighter in construction.

Vertical openings 17 are provided in the body portion 11 for receiving the lower threaded ends of U-bolts 18 of a conventional type suspension clamp 19. As shown in Fig. 3 the lower surface of the suspension clamp 19 is curved as at 21. The upper surface of the body portion 11 is provided with a concave portion 22 which corresponds generally to the curved lower surface 21 of the suspension clamp 19, thereby providing a snug fit between the yoke 10 and the suspension clamp.

The body of the suspension clamp 19 is generally U-shaped, as viewed in transverse section, so as to provide the usual longitudinally extending groove for receiving a cable or conductor C. Disposed to fit within the longitudinally extending groove of the suspension clamp 19 is the usual keeper 23 which is pulled tightly down on the cable C by means of the U-bolts 18. Nuts 24 are provided on the threaded ends of the U-bolts 18 beneath the body portion 11 of the yoke, whereby the yoke and suspension clamp are secured rigidly to each other with the cable in place.

The suspension clamp 19 is provided with a clevis 26 and clevis pin 27 for attaching the clamp to a supporting member indicated generally at 28. The clevis pin 27 is held in place by any suitable means, such as by a cotter key 29.

As shown in Fig. 3, the protuberance 12 is of a thickness to fit snugly within an upstanding clevis member 26' of a subjacent suspension clamp 19'. A clevis pin 27' extends through the clevis member 26' and the opening 13 in the yoke 10, thereby pivotally connecting the lower suspension clamp 19' to the yoke 10.

From the foregoing description, the erection and operation of my improved bundling yoke will be readily understood. The suspension clamp 19 is assembled in the usual manner with the U-bolts 18 projecting outwardly thereof. The yoke 10 is positioned adjacent the bottom of the clamp 19 with the surfaces 21 and 22 in contact with each other and with the threaded ends of the U-bolts 18 extending downwardly through the openings 17. The keeper 23 and the yoke 10 are then secured in place by means of the nuts 24. The clamp 19 is suspended from the support member 28 in the manner well understood.

When it is desired to attach the suspension clamp 19' to the originally installed suspension clamp 19, the clamp 19' is attached to the yoke 10 by inserting the clevis pin 27' through the clevis 26' and the opening 13 in the yoke 10. The suspension clamp 19' is thus supported from the suspension clamp 19 by means of a single pivotal connection.

In Fig. 4 of the drawing I show a modified form of bundling device in which the protuberance 12 of the yoke 10 is connected to a clevis 31 of a strap member 32 by means of a clevis pin 33. The other end of the strap 32 is provided with a clevis 34 which is of a size to fit within the clevis member 26' of the subjacent suspension clamp 19'. A clevis pin 36 passes through the clevis 34 and the clevis member 26' whereby the subjacent suspension clamp is pivotally connected to the strap 32. By connecting the suspension clamps with straps 32 of different lengths, the distance between clamps may be varied.

From the foregoing, it will be seen that I have devised improved means for connecting suspension clamps. By connecting the bundling yoke 10 directly to the first suspension clamp installed at the time of installation, the second suspension clamp may be connected thereto with a minimum of effort and without having to interfere with the supporting clevis pin for the suspension clamp originally installed. Also, there are no loose parts hanging from the original installation, thereby eliminating the noise which is encountered where bundling straps are attached to the hinge pin which supports the original suspension clamp. Furthermore, by providing a strap which may be connected to the yoke 10 after the yoke and the first suspension clamp are installed, the distance between the suspension clamps 19 and 19' may be readily varied.

While I have shown my invention in but two forms it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. Apparatus for supporting two vertically spaced electrical conductors comprising an upper suspension clamp mounted at its upper end to a support member for pivoting in a vertical plane and having a substantially flat lower end surface, said upper clamp supporting the upper conductor, a bundling yoke secured to said upper suspension clamp and having a substantially flat upper end surface in face-to-face contact with said lower end surface, said bundling yoke having a downwardly extending projection with a transverse opening therethrough, a lower suspension clamp having a clevis on the upper end thereof for fitting over said downwardly extending projection, said clevis having transverse openings aligned with the opening in said projection, securing means extending through said openings and pivotally connecting said lower suspension clamp to said yoke for pivoting in a substantially vertical plane, said lower suspension clamp supporting the lower conductor and being aligned vertically with said upper suspension clamp and said yoke, said lower suspension clamp being detachable from said yoke whereby said lower suspension clamp with said lower conductor may be connected and disconnected from said yoke without interfering with said upper suspension clamp and said upper conductor.

2. Apparatus for supporting two vertically spaced electrical conductors comprising an upper suspension clamp mounted at its upper end to a support member for pivoting in a vertical plane, said upper clamp supporting the upper conductor, a bundling yoke secured to the underside of said upper suspension clamp, said bundling yoke having a downwardly extending projection with a transverse opening therethrough, a lower suspension clamp having a clevis on the upper end thereof for fitting over said downwardly extending projection, said clevis having transverse openings aligned with the opening in said projection, securing means extending through said openings and pivotally connecting said lower suspension clamp to said yoke for pivoting in a substantially vertical plane, said lower suspension clamp supporting the lower conductor and being aligned vertically with said upper suspension clamp and said yoke, said lower suspension clamp being detachable from said yoke whereby said lower suspension clamp with said lower conductor may be connected and disconnected from said yoke without interfering with said upper suspension clamp and said upper conductor.

References Cited in the file of this patent

UNITED STATES PATENTS

| 508,914 | Cain | Nov. 21, 1893 |
| 1,781,072 | Neidhammer | Nov. 11, 1930 |
| 1,789,672 | Deisch | Jan. 20, 1931 |
| 2,058,174 | Monroe | Oct. 20, 1936 |

FOREIGN PATENTS

| 55,811 | Sweden | Feb. 20, 1922 |
| 875,125 | France | June 8, 1942 |